UNITED STATES PATENT OFFICE.

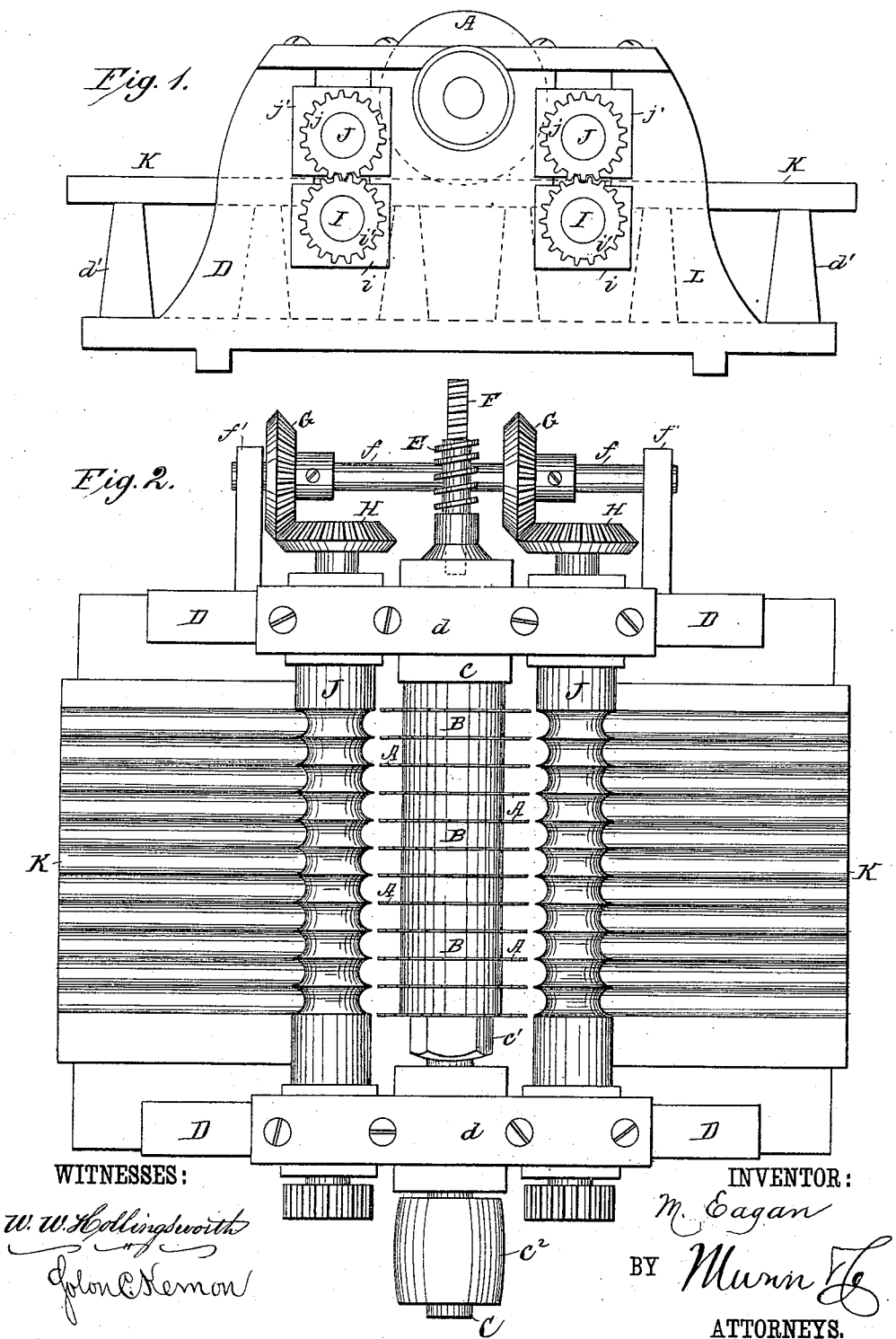

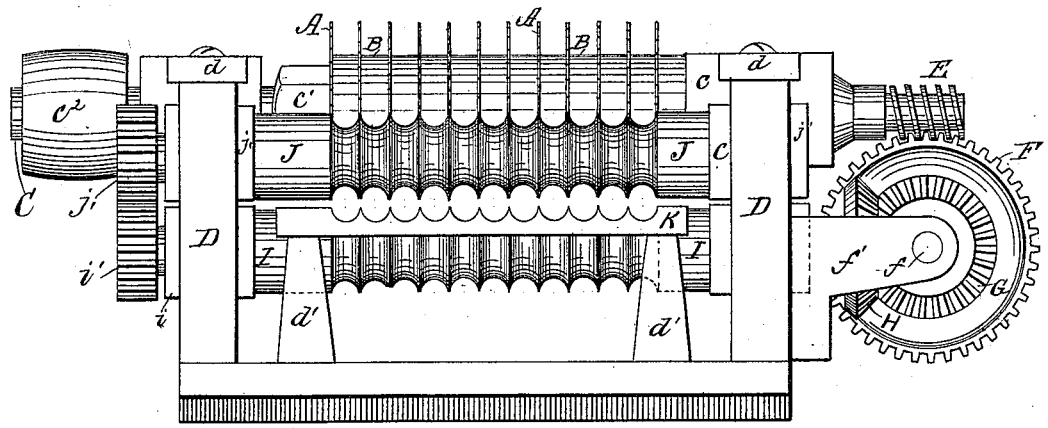

MATHEW EAGAN, OF CLEVELAND, OHIO.

CARBON-CUTTING MACHINE.

SPECIFICATION forming part of Letters Patent No. 323,125, dated July 28, 1885.

Application filed April 1, 1885. (No model.)

*To all whom it may concern:*

Be it known that I, MATHEW EAGAN, of Cleveland, Cuyahoga county, Ohio, have invented a new and Improved Carbon-Cutting Machine; and I do hereby declare the following to be a full, clear, and exact description of the same, reference being had to the accompanying drawings, forming a part of this specification, in which—

Figure 1 is an end view of the carbon-cutting machine. Fig. 2 is a plan view of the same. Fig. 3 is a side elevation. Fig. 4 is an end view of the carbons as they come from the press before passing through the machine.

This invention relates to machines for separating carbons as they come from the press into separate sticks; and it consists in the detailed construction of the parts hereinafter described, by which the carbons are simultaneously separated from one another, and have all of the web by which they were joined together completely removed.

This invention further consists in the combination, with the mechanism for separating the carbons, of grooved rollers and guide-plates, by which the carbons are guided and carried forward while being acted on by the said separating mechanism.

In the accompanying drawings similar letters of reference indicate corresponding parts.

A A are a series of circular saws, the thickness of which is made to correspond with the width of the web which unites the carbon sticks as they come from the press. These saws are separated by washers B, the thickness of which corresponds with the diameter of the carbon sticks when separated. Any number of saws and washers may be employed, so as to operate upon as many carbon sticks as desired. The saws and washers are mounted on a spindle, C, having a collar, $c$, thereon, and a screw-threaded portion provided with a nut, $c'$, for holding the said saws and washers tightly between it and the collar. The spindle C runs in bearings $d$ in the framing D of the machine, and is provided at one end with the driving-pulley $c^2$, and at the other with the worm E.

F is a worm-wheel, which is mounted on shaft $f$, running in bearings $f'$, attached to the framing of the machine, and is driven by the worm-wheel E. Two bevel-wheels, G, are also secured upon shaft $f$, one on either side of the worm-wheel. These bevel-wheels gear into two other bevel-wheels, H, secured upon the ends of two grooved rollers, I, which extend through the framing of the machine, and have their bearings $i$ in it. Two spur-pinions, $i'$, are secured on the opposite ends of rollers I, and gear into similar spur-pinions, $j$, fastened upon the ends of two other rollers, J, also made with grooves on their surface similar to those in rollers I, and working directly above them. The rollers J are not mounted in rigid journals in the framing of the machine the same as rollers I, but run in blocks $j'$, which admit of the said rollers moving vertically through a short space, and thus adjusting themselves to the thickness of the carbons to be cut.

K are grooved plates, which are secured to the pillars $d'$, which project upward from the base of the frame-work. These plates are attached at either end of the machine, and also in the middle underneath the saws, and have their grooves arranged to correspond with the grooves in the rollers I and J, and with the saw-blades A, so that the carbons are guided by the plates, carried forward by the motion of the rollers, and separated by the saws.

I do not confine myself to the exact arrangement of the parts as shown in the drawings, as the saws can be placed either above or below the carbons when cutting them off, and many other modifications may be made in the arrangement of the other parts of the machine without altering it substantially.

The grooved rollers may be made of metal or of rubber, for increasing their grip on the carbons.

Having thus described my invention, what I claim as new, and desire to secure by Letters Patent, is—

1. In a carbon-cutting machine, the combination of the saw-blades A, mounted on spindle C, and separated by washers B, with the grooved rollers I and J, driven through suitable mechanism from the spindle on which the said saws are mounted, the grooves of said rollers being arranged coincidently with the spaces between the saw-blades, substantially as described, and for the purpose set forth.

2. In a carbon-cutting machine, the combination of the saw-blades A, mounted on spindle C, and separated by washers B, with the grooved rollers I and J, driven from the said spindle C, and with the grooved guide-plates K, substantially as described and shown, and for the purpose set forth.

3. In a carbon-cutting machine, the combination of grooved rollers I, mounted in bearings $i$ in the frame-work of the machine and driven through suitable mechanism from the saw-spindle, with the grooved rollers J, driven from said rollers I by suitable gearing, and mounted in blocks $j$, which allow the said rollers J to have a slight vertical movement, substantially as described and shown, and for the purpose set forth.

4. The combination of the spindle C, having driving-pulley $c^2$, collar $c$, nut $c'$, and a series of saws and washers mounted thereon, the worm E, worm-wheel F, mounted on shaft $f$, bevel-wheels G and H, and grooved rollers I and J, substantially as described and shown.

5. The combination of the spindle C, having driving-pulley $c^2$, collar $c$, nut $c'$, and a series of saws and washers mounted thereon, the worm E, worm-wheel F, mounted on shaft $f$, bevel-wheels G and H, grooved rollers I, running in fixed bearings $i$, grooved rollers J, running in vertically-movable blocks $j$, and driven from said rollers I, and the grooved guide-plates K, attached to the framing of the machine, substantially as described and shown, and for the purpose set forth.

MATHEW EAGAN.

Witnesses:
JOHN DRISCOLL,
JOE McKUNE,
E. B. BAUDER.